United States Patent [19]

Baux et al.

[11] Patent Number: 5,070,731
[45] Date of Patent: Dec. 10, 1991

[54] DEVICE FOR MEASURING THE LEVEL OF LIQUID CONTAINED IN A SUBSTANTIALLY DEEP RESERVOIR

[75] Inventors: Christian Baux, Levallois; Isabelle Chantome, Paris, both of France

[73] Assignee: Jaeger, Levallois-Perret, France

[21] Appl. No.: 452,554

[22] Filed: Dec. 19, 1989

[30] Foreign Application Priority Data

Dec. 20, 1988 [FR] France .................. 88 16829

[51] Int. Cl.$^5$ .................. G01F 23/60; G01F 23/44
[52] U.S. Cl. .................. 73/313; 73/311; 73/319; 338/33
[58] Field of Search .................. 73/313, 308, 311, 319; 338/33; 340/619

[56] References Cited

U.S. PATENT DOCUMENTS

| | | | |
|---|---|---|---|
| 2,574,432 | 11/1951 | Brown et al. | 338/33 X |
| 2,592,929 | 4/1952 | Matchett | 338/33 X |
| 3,113,282 | 12/1963 | Coleman | 338/33 |
| 4,342,224 | 8/1982 | Hara et al. | 73/313 X |
| 4,641,523 | 2/1987 | Andreasson | 338/33 X |
| 4,702,107 | 10/1987 | Guerrini et al. | 338/33 X |
| 4,723,446 | 2/1988 | Saito et al. | 73/313 |
| 4,724,705 | 2/1988 | Harris | 73/313 |
| 4,827,769 | 5/1989 | Riley et al. | 73/313 |

FOREIGN PATENT DOCUMENTS

2578049 2/1986 France .
2086576 5/1982 United Kingdom .

Primary Examiner—Daniel M. Yasich
Attorney, Agent, or Firm—Blakely, Sokoloff, Taylor & Zafman

[57] ABSTRACT

Disclosed is a device for the measurement of the level or volume of a liquid contained in a resrvoir of the type containing a casing that houses an element defining two generally vertical separate electrical tracks, at least one of which is electrically resistant, and a float that is capable of following the level of the liquid and bears a slider capable of connecting the two tracks, said device comprising at least one spacer that connects the housing and the element defining the tracks, at least two floats placed on either side of the spacer and means ensuring that at least the slider of the upper float is separated from at least one of the tracks when it reaches the lower final stage of its movement adjacent to the spacer.

16 Claims, 7 Drawing Sheets

DEVICE FOR MEASURING THE LEVEL OF LIQUID CONTAINED IN A SUBSTANTIALLY DEEP RESERVOIR

BACKGROUND OF THE INVENTION

1. Field of the Invention

The present invention concerns the field of devices for measuring the level or the volume of a liquid contained in a reservoir.

The present invention, more precisely, concerns a device for measuring the level or the volume of a liquid contained in a reservoir of the type comprising a casing that houses an element defining two generally vertical, separate electrical tracks, at least one of which is electrically resistant; and a float capable of following the level of the liquid, which bears a slider capable of connecting the two tracks.

The value of the resistance measured between the two ends of the tracks directly represents the above-mentioned level and/or volume.

2. Description of the Prior Art

Many devices of the type indicated above have already been proposed.

The documents FR-A-2 550 338, FR-A-2 503 861 and FR-2 534 375 describe exemplary embodiments of these devices.

The problem that arises is of designing measuring devices of the type indicated above having a substantial depth, for example, a depth of more than one meter.

As the element defining the two electrical tracks is generally made with elongated strips punched into a printed circuit, which strips consequently have poor mechanical strength, it appears to be necessary for devices of substantial depth to have spacers for reinforcing purposes between the element defining the two tracks and the casing.

However, since for reasons of sensitivity, equilibrium and cost, the float has to be made in the form of a ring-shaped body surrounding the above-mentioned element, the spacers hinder the movement of the float all along the height of the tracks.

Figure 1:
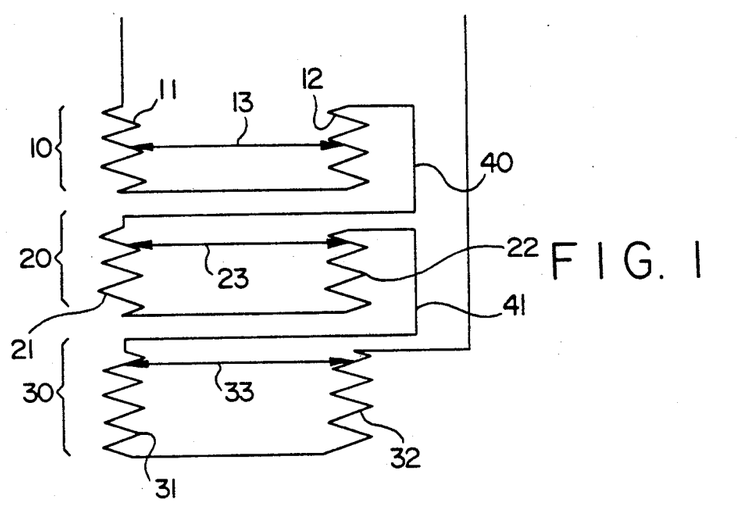
FIG. 1 gives a schematic view of the prior approach envisaged by the Applicant.

To try and remove this drawback, subsequent to research and as shown in the appended FIG. 1, the Applicant has considered the superimposition of several devices known in the prior art, each comprising two conductive tracks and one float placed respectively on either side of spacers, and the series connection of the corresponding tracks.

In the appended FIG. 1, reference numbers 10, 20, 30 have been assigned to three known superimposed devices shown schematically here. The device 10 has two tracks 11, 12 and a float bearing a slider 13. The device 20 has two tracks 21, 22 and a float which has a slider 23. The device 30 has two tracks 31, 32 and a float which has a slider 33. The connections that serially connect the tracks 12 and 21 and 22 and 31 are referenced 40, 41. The above-mentioned spacers are placed between the devices 10, 20, 30 to physically separate the floats of each device. These spacers re not represented in the schematic illustration of FIG. 1.

Following tests, it has proved to be the case that the arrangements shown in FIG. 1 provide a theoretical solution to the above-mentioned problems, but are not entirely satisfactory in practice.

Firstly, the devices shown in FIG. 1 require the presence of conductive connections 40, 41 on the elements 10, 20, parallel to the tracks 11, 12 and 21, 22 respectively. The width and the cost of the corresponding elements are therefore substantially increased. Secondly, in certain configurations, it is possible to find six slider/track contact resistors in series, and this greatly disturbs the measurement.

SUMMARY OF THE INVENTION

The present invention now eliminates all the above-mentioned drawbacks by means of a device comprising at least one spacer that connects the casing and the element defining the tracks, at least two floats on either side of the spacer and means ensuring that at least the slider of the upper float is separated from at least one of the tracks when it reaches the final lower stage of its movement adjacent to the spacer.

BRIEF DESCRIPTION OF THE DRAWINGS

Other characteristics, aims and advantages of the present invention will appear from the following detailed description, made example. In these figures:

FIGS. 8 and 9 show views of the same device, illustrated by the arrows referenced VIII and IX in FIGS. 3 and 4; while

DESCRIPTION OF A PREFERRED EMBODIMENT

Figure 2:
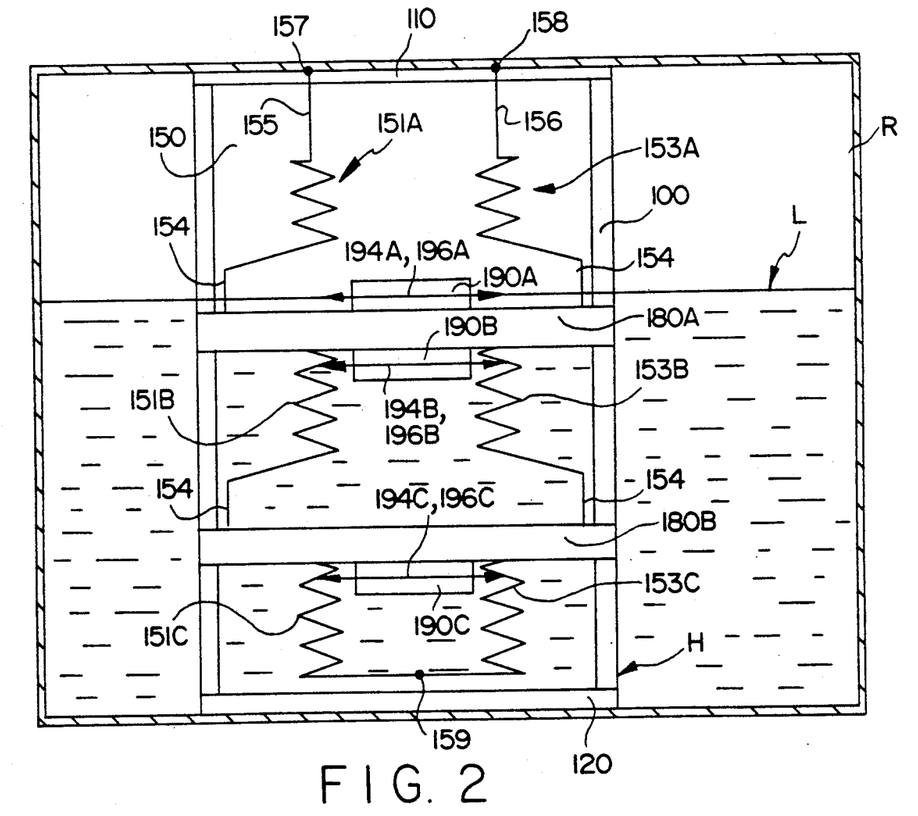
FIG. 2 gives a schematic view of the device according to the present invention.
Figure 3:
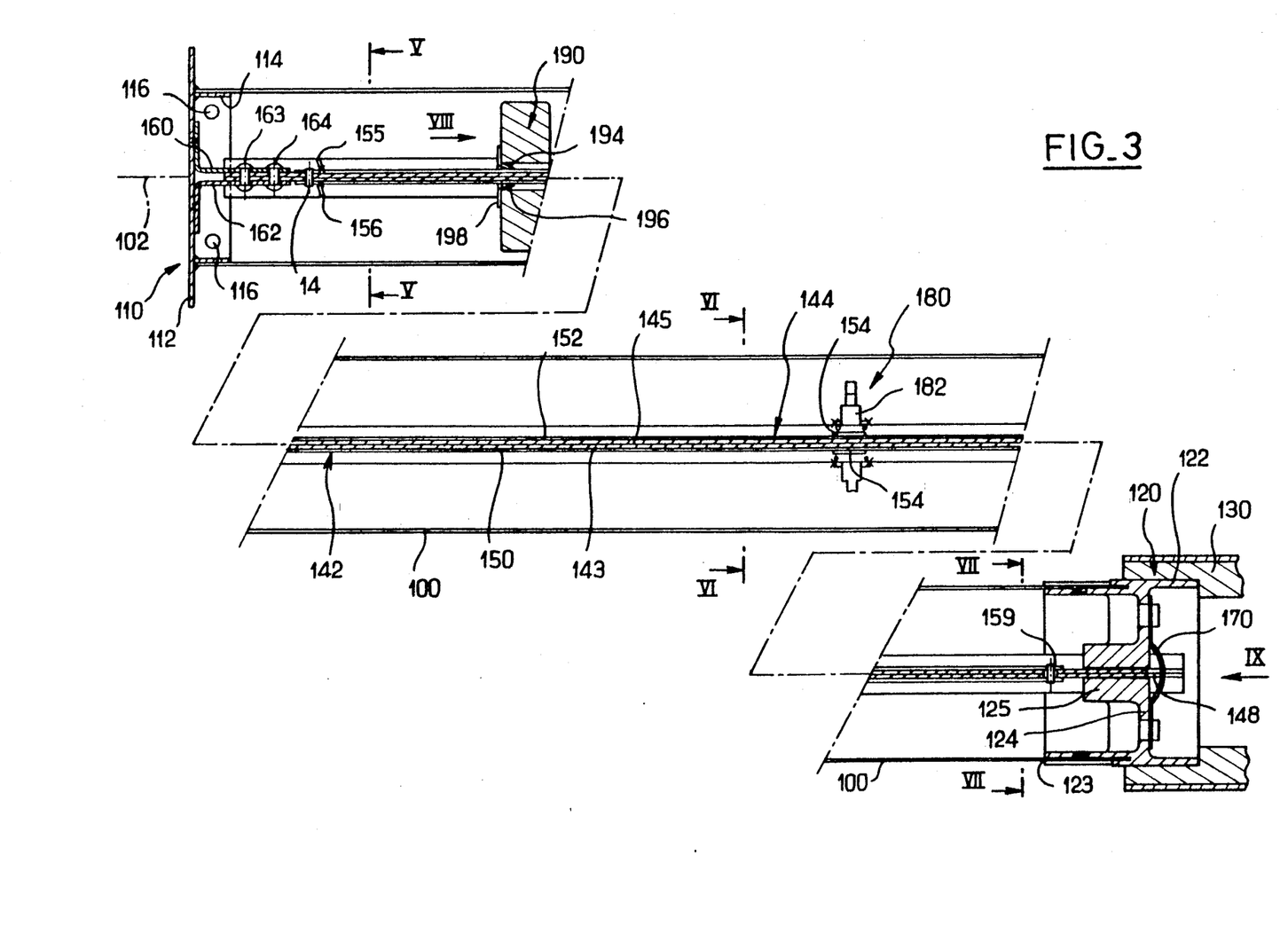
FIGS. 3 and 4 show two longitudinal sectional views, as seen from orthogonal directions, of a device according to the present invention.
Figure 4:
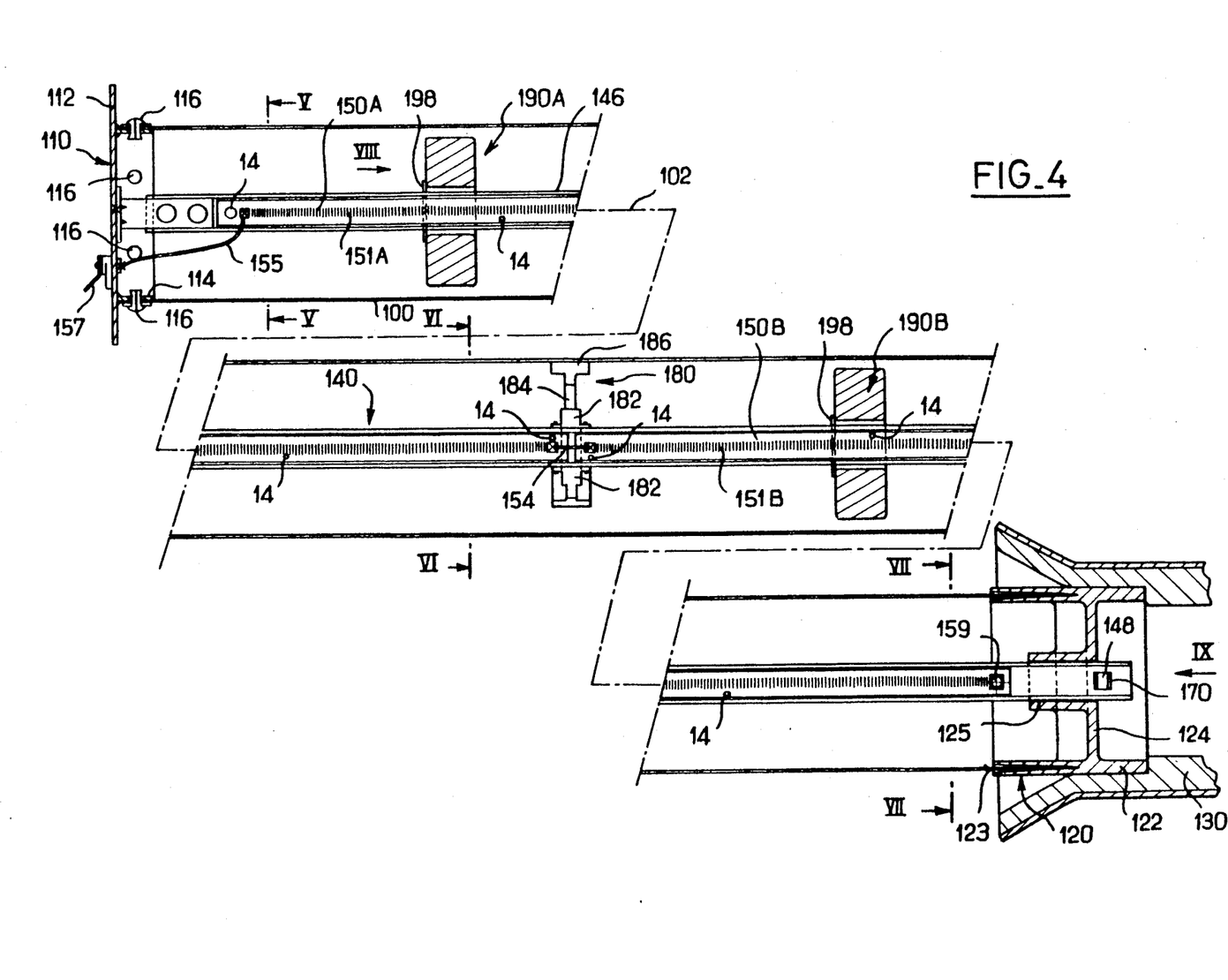

FIGS. 2, 3 and 4 feature the casing 100 of the measuring device. Moreover, FIG. 2 shows schematically casing 100 in reservoir R having a level L of a liquid to be measured. This casing 100 is advantageously formed by a cylindrical tube, the axis 102 (shown in FIG. 3) of which is vertical during use. However, it will be noted that, as a variant, the section of the casing may be other than circular. For example, the casing may have any polygonal cross-section. In +h=same way if, preferably, the axis 102 of the casing is vertical, it will be noted that this axis 102 may have a slight tilt with respect to the vertical during use.

As illustrated in FIG. 3, the casing 100 is fixed at its upper end to an upper base 110. This upper base 110 has a plate 112, orthogonal to the axis 102, and an annular collar 114. This annular collar 114 is fixed to the upper end of the casing 100 by any appropriate standard means, for example by means of rivets 116.

Still in FIG. 3, at its lower end the tube 100 is engaged in a lower base 120. The lower base 120 has a cylindrical bushing 122, a disk 124 and a central sleeve 125. The bushing 122 is centered on end of the casing 100. Preferably, the lower end of the casing 100 is snapped into the groove 123 as illustrated in FIG. 3.

The disk 124 extends into the bushing 122, crosswise to the axis 102. The sleeve 120 is borne by the disk 124 on the upper surface of this disk. It is centered on the axis 102. The bushing 122 itself is received in a centering piece 130. This centering piece may have very many embodiments and shall therefore not be described in greater detail hereinafter.

The casing 100 houses a central element 140, shown in FIG. 4. This central element 140 is formed by two supporting elements 142, 144 which are longitudinal, vertical and symmetrical with the axis 102 of the casing, as depicted in FIG. 3.

Figure 5:
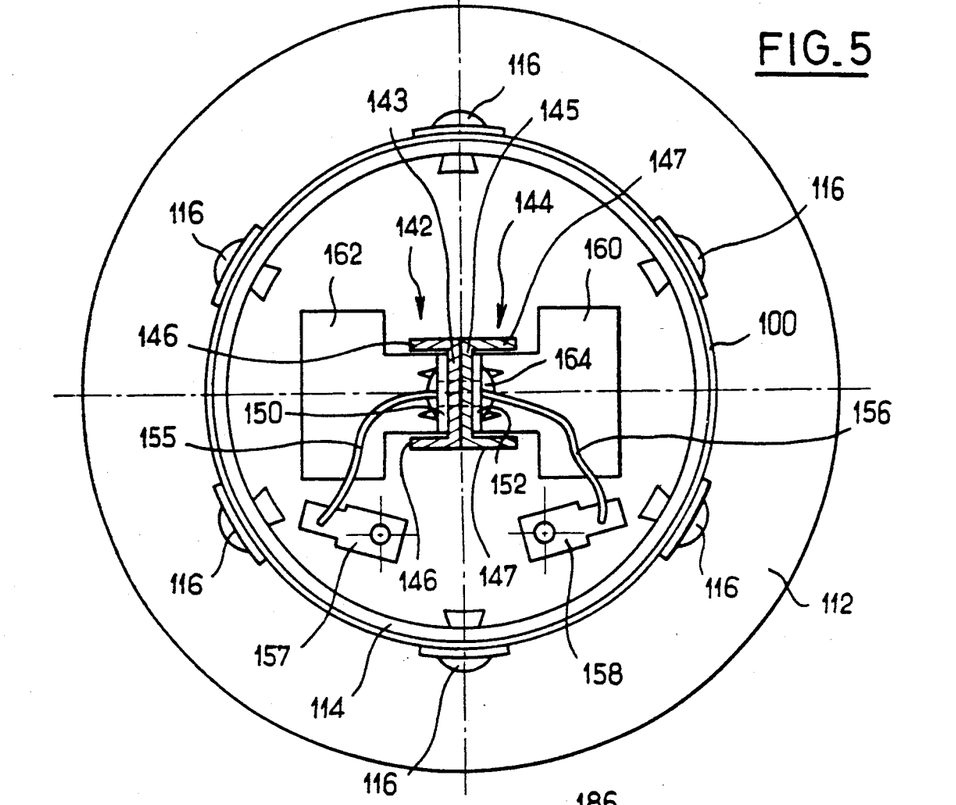
FIGS. 5, 6 and 7 show three cross-sectional views of the same device along sectional planes respectively referenced V—V, VI—VI, and VII—VII in FIGS. 3 and 4.
Figure 7:
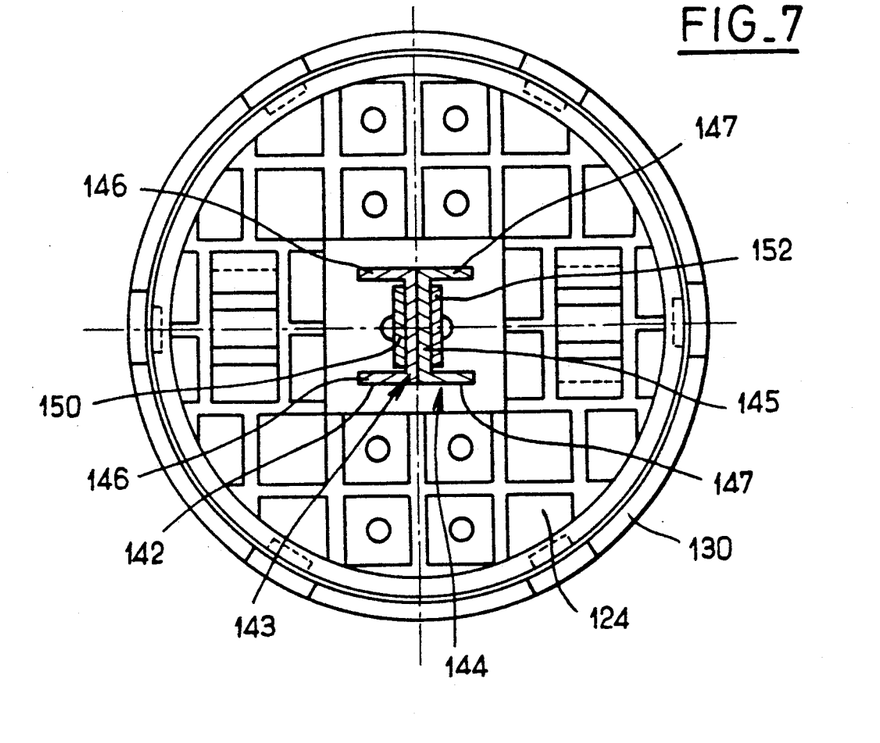

The supporting elements 142, 144 of FIG. 3 are preferably formed by angle type metallic structural sections with a C-shaped section. The supporting elements 142, 144 are back to back so that their webs 143, 145 are in contact and so that their concavities are facing opposite directions. As shown in FIGS. 3, 5 and 7, the two supporting elements 142, 144 each support a terminal strip 150, 152 on the free external surface of their respective webs 143, 145. The terminal strips 150, 152 are formed by standard printed circuits or by thick layers on an insulating substrate such as glass or ceramic, for example. They each have at least one track.

Thus, only one terminal strip 150, 152 may be provided on each of the supporting elements 142, 144, as best illustrated in FIG. 3. In this case, each of the terminal strips 150, 152 extends over almost the entire height of the supporting elements 142, 144. As a variant, it is possible to consider superimposing several terminal strips on each of the supporting elements 142, 144, said terminal strips extending over only a part of the height of the supporting elements. These may be terminal strips such as the ones referenced 150A, 150B in the appended FIG. 4.

In this case, it is necessary to serially interconnect the tracks provided on these various terminal strips 150A, 150B, using any appropriate standard means such as, for example, soldered connections schematically referenced 154 in FIG. 4.

Preferably, the terminal strips 150, 152 are fixed to supporting elements 142, 144, using rivets (not shown). These rivets are engaged in elongated drillings, extending in a direction parallel to the axis 102, made in the terminal strips 150, 152. The elongated disposition of the bores that receive the rivets permits a relative longitudinal movement between the terminal strips 150, 152 and the supporting elements 142, 144.

At their upper end, the supporting elements 142, 144 are fixed to the upper base 110, by means of two angle irons 160, 162 respectively, as best seen in FIG. 3. As a non-restrictive example, the angle irons 160, 162 can be soldered to the upper base 110 while they are fixed to the supporting elements 142, 144 by means of rivets 163, 164.

Figure 9:
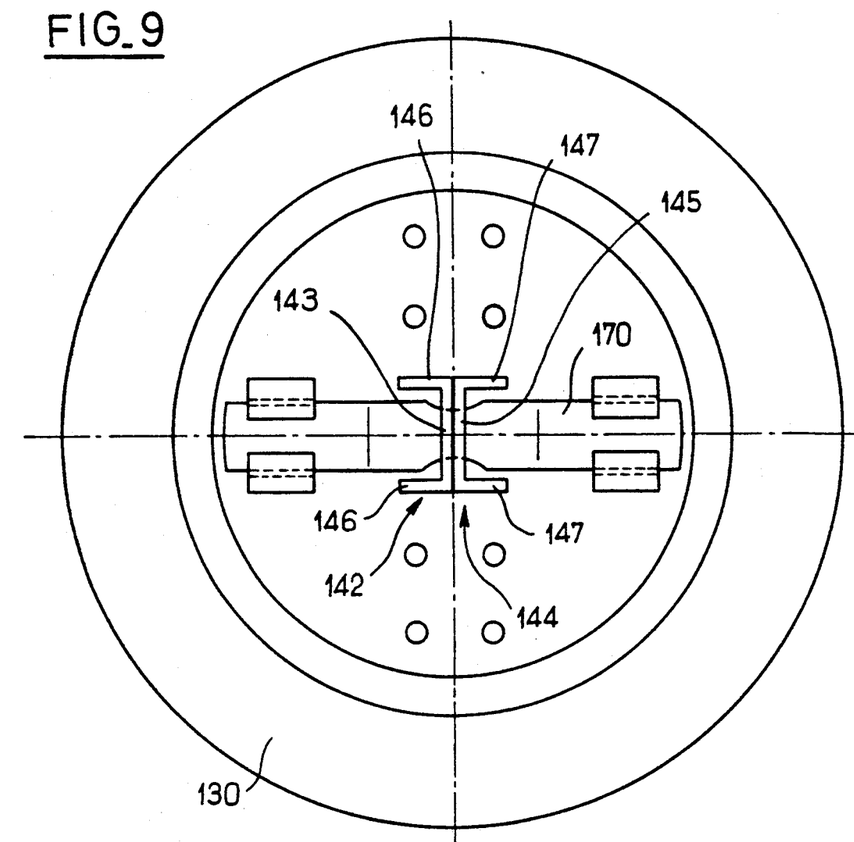

At their lower end, the supporting elements 142, 144 are not rigidly fixed to the lower base 120. However, there is provision at the base 120 for means providing for a downward elastic stress on the supporting elements 142, 144 in order to keep the terminal strips 150, 152 constantly under tension. The stress-providing means may have many embodiments. According to the preferred embodiment shown in FIGS. 3, 4 and 9, these stress-providing means are formed by an elastic strip 170. This strip 170 is engaged in a hole 148 made in the lower end of the supporting elements 142, 144. Besides, as shown in FIGS. 3 and 4, the elastic strip 170 rests on the lower surface of the disk 124.

According to the depiction of the appended FIGS. 3 and 4, a spacer 180 is provided between the casing 100 and the supporting elements 142, 144, substantially at mid-length on the casing 100.

According to the preferred embodiment shown in the appended FIGS. 3 and 4, the spacer 180 has a central shaft 182 fixed to the supporting elements 142, 144 by any appropriate standard means such as, for example, by soldering or riveting.

Figure 6:
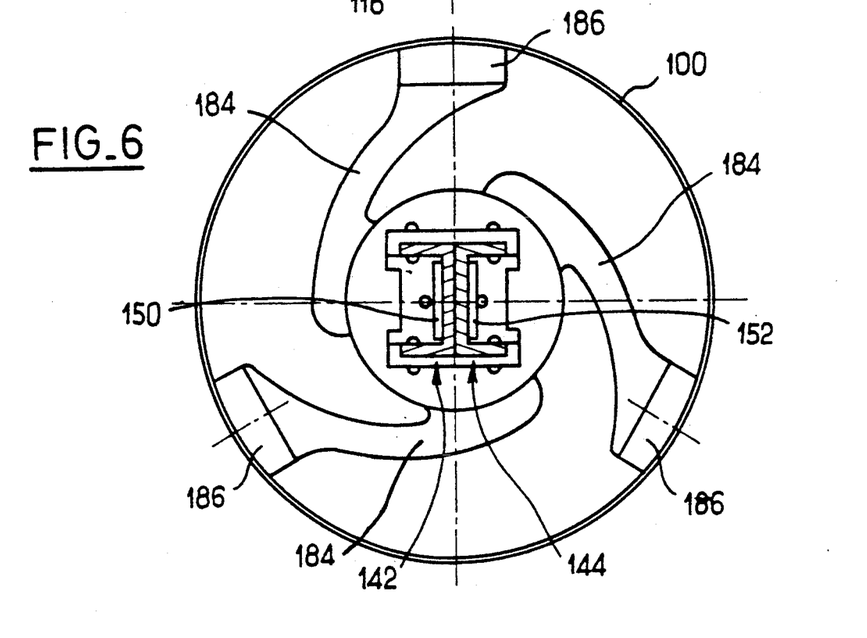

The central shaft 182 has three generally radial arms 184 which, however, are tangentially attached to the shaft 182. As shown in FIG. 6, each of the arms 184 has, at its radially external end, a skid 186 that rests on the inner surface of the casing 100.

According to the embodiment shown in the appended FIGS. 3 and 4, wherein one spacer 180 is provided, the device has two floats 190, respectively arranged on either side of the spacer; more precisely an upper float 190A and a lower float 190B shown in FIG. 4.

The floats 190 are preferably identical. The floats 190 have the general shape of annular body engaged in the supporting elements 142, 144. The floats 190 are guided in a sliding motion on the supporting elements 142, 144, parallel to the axis 102, by means of any appropriate standard means known to those skilled in the art. According to the depiction given in FIG. 8, each float 190 has bosses 192 which lie on the inner surface of each of the two flanges 146, 147 of the supporting structural sections 142, 144.

Figure 8:
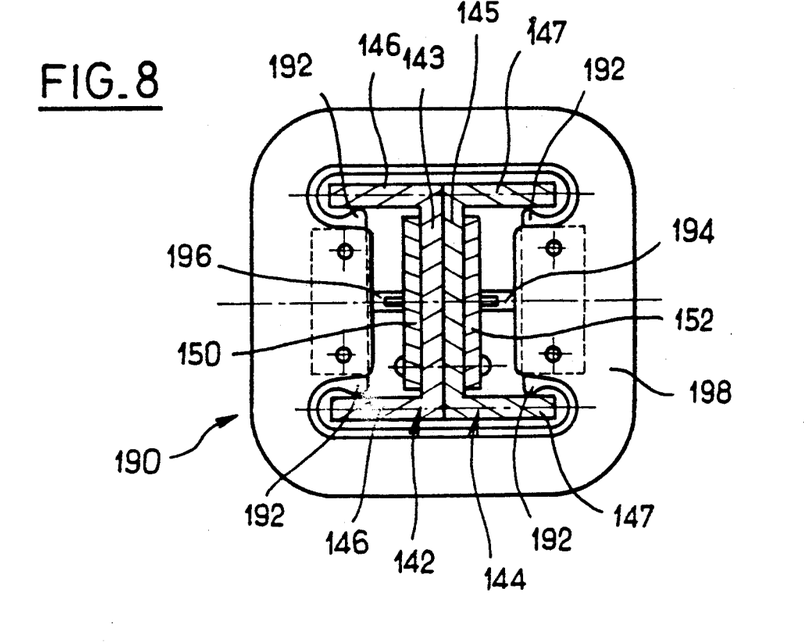

Furthermore, according to the depiction given in FIG. 8, each of the floats 190 has a slider connecting the two tracks, respectively provided on each of the terminal strips 150, 152. The slider is formed by two wipers 194, 196, respectively in contact with one of the tracks and connected to each other by an electrically conductive plate 198.

As indicated above, according to the present invention, there is provision for means ensuring that at least the slider of the upper float 190A is separated from at least one of the associated tracks when it reaches the lower final stage of its movement adjacent to the spacer 180.

As shown schematically in appended FIG. 2, these means may be formed by the fact that at least one of the tracks diverges from the slider 194 (A, B or C), 196 (A, B or C) at the level of its zone which is adjacent to a spacer 180 (A or B) and superimposed on this spacer. Thus, when the corresponding float 190 (A, B or C) comes to rest against the spacer 180 (A or B), it is automatically turned off and makes the slider borne by the float immediately below becomes active, as can be seen from a scrutiny of FIG. 2.

More precisely, if the level L of liquid in the reservoir is above the spacer 180A, the information on level or volume picked up between the two upper terminals of the tracks depends directly on the position of the upper float 190A.

If the level of the liquid is located below the spacer 180A, the information on level or volume measured between the two upper terminals depends solely on the position of the lower float 190B.

Figure 11:
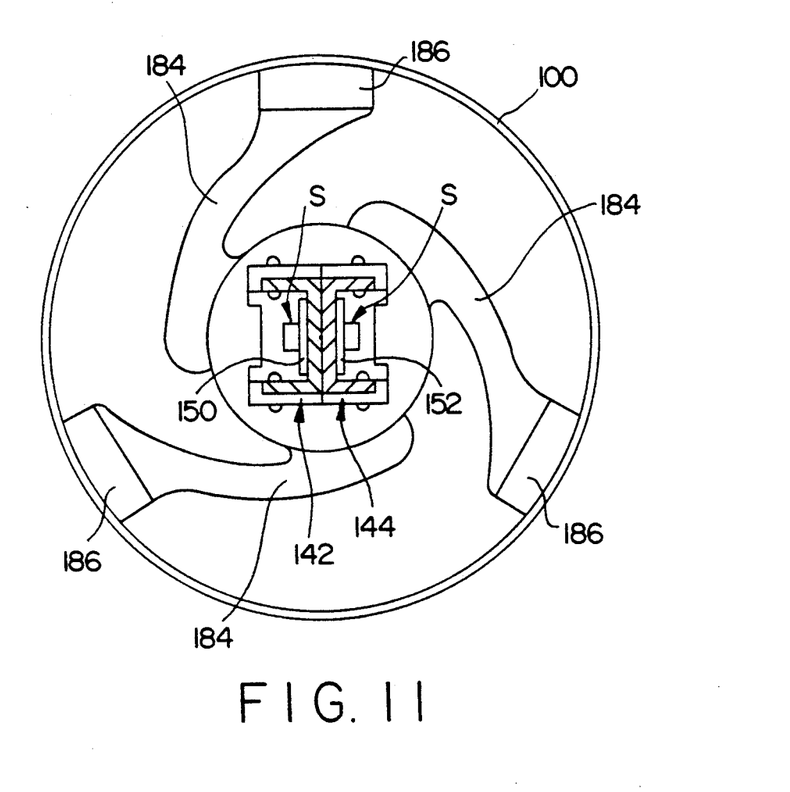
FIG. 11 shows a sectional view of the device similar to FIG. 6, with separating means provided on the spacer.

As a variant, it is possible to design the electrical tracks borne by the terminal strips so that they extend in a position facing the path of movement of the sliders throughout the height of this path; but there is provision for means, for example, borne by each spacer 180 (A or B), to move the slider away from at least one of the tracks when the corresponding float reaches the final lower stage of its movement adjacent to the spacer. An example of such separating means is provided on the spacer 180 and is illustrated on FIG. 11 under reference S.

Clearly, the present invention is not restricted to the use of one spacer and two floats. It can be extended, generally, to any device including x number of spacers 180 and x+1 number of floats 190 arranged respectively on either side of a spacer, where x is an integer.

Should, for example, as shown schematically in FIG. 2, the device have two spacers 180A, 180B and three floats 190A, 190B and 190C, then the information on level L and volume depends on the position of the upper float 190A if the level of the liquid is above the upper spacer 180A; the information depends on the position of the intermediate float 190B if the level L of liquid is between the two spacers 180A and 180B; and finally, the information depends on the position of the lower float 190C if the level L of the liquid is below the lower spacer 180B. The upper float 190A is provided with wipers 194A and 196A, the intermediate float 190B is provided with wipers 194B and 196B, and the lower float 190C is provided with wipers 194C and 196C.

Of course the internal volume of the casing 100 should communicate with the reservoir to be gauged to enable a faithful and representative movement of the floats 190 (A, B or C). For example, a hole H may be provided at the bottom end of the casing 100, as illustrated on FIG. 2, to allow communication between the internal volume of the casing 100 and the reservoir R.

In appended FIGS. 2 and 4, the reference numbers 151A, 151B and 153A, 153B are assigned to identify the tracks provided, respectively, on the terminal strips 150, 152. Specifically in appended FIG. 2, the reference numbers 151A, 151B, 151C and 153A, 153B, 153C are assigned to the tracks. It is recalled that at least one of the two tracks 151, 153 is electrically resistant. Furthermore, in appended FIGS. 2-5, the reference numbers 155 and 156 have been assigned to the wire connections soldered to the upper ends of the tracks 151 and 153, respectively, and soldered to terminals 157, 158, themselves fixed to the plate 112 of the upper base 110. Those skilled in the art will easily understand that the information representing the level and/or volume of liquid contained in the reservoir is obtained by measuring the resistance between the two terminals 157 and 158.

Preferably, at their lower end, the tracks 151, 152 are connected to each other by a rivet 159 shown in FIGS. 3 and 4, and schematically illustrated on FIG. 2.

Those skilled in the art will easily understand that the geometry of the spacer 180 which in the appended figures, especially in FIGS. 3, 4 and 6, with its arms 184 connected tangentially to the central shaft 182 makes it possible, firstly, to notably restrict the transmission of the external forces or vibrations experienced by the casing 100 to the supporting elements 142, 144 and to the terminal strips 150, 152 borne by these supporting elements; and secondly, to permit a differential thermal expansion between the casing 100 and the supporting elements 142, 144.

Figure 10:
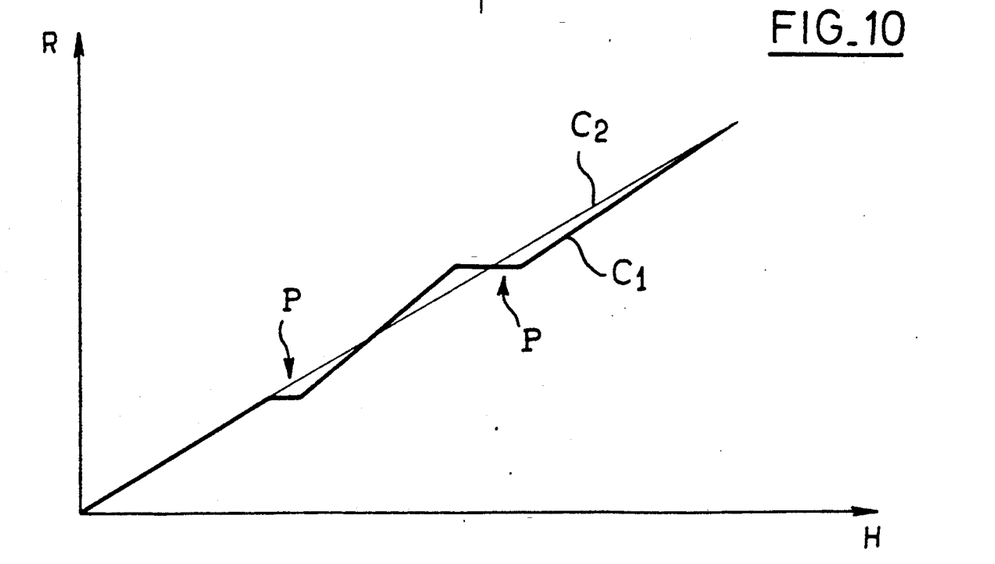
FIG. 10 shows a schematic view of the response curve obtained with a device according to the present invention.

The appended FIG. 10 gives a schematic view, under the reference $C_1$, of an empirical curve of resistance R measured between the two terminals 157, 158 as a function of the depth of the liquid in the reservoir and, under the reference $C_2$, the theoretical curve sought. It will be noted that the empirical curve shows steps P corresponding to the stages during which the sliders are successively disconnected from the tracks. The result thereof is that the real curve $C_1$ cannot faithfully follow the theoretical curve $C_2$. However, those skilled in the art are capable, notably through the arrangements described in the prior art documents cited in the introduction to the present application, of correcting the resistance value measured in order to approach the theoretical curve $C_2$ as close as possible. Moreover, it will be noted that the precision of the measurement is a preponderant factor for low levels or volumes of liquid remaining in the reservoir. Consequently, the resistive value of the tracks 151, 153 will be preferably adapted, as shown in FIG. 10, to faithfully follow the theoretical curve $C_2$ for the lowest liquid level values for which only the slider borne by the lower float is active.

It is clear that the present invention is not restricted to the particular embodiment that has just been described, but extends to all variants that conform to its spirit.

If necessary, one of the terminal strips may be removed. The corresponding track is then closed by one of the supporting elements.

What is claimed is:

1. A device for the measurement of a level or volume of liquid contained in a reservoir, comprising:
    a casing that houses the device;
    a supporting means supporting two generally vertical, separate electrical tracks, at least one of the tracks having an electrical resistance between its terminals;
    at least one spacer connecting the casing and the supporting means for the electrical tracks for reinforcing the supporting means;
    a plurality of floats placed on either side of each of the spacers, said plurality of floats including an upper float and a second float;
    a slider supported on each of the floats to connect the two tracks;
    a guide means on said supporting means for guiding said floats in vertical translation so that the floats follow the level of liquid; and
    wherein the sliders follow a vertical path and at least one of the tracks in its zone adjacent to a spacer superimposed on its diverges from the vertical path of the slide so as to ensure that at least the slider of the upper float is separated from at least one of the tracks when it reaches a lower final stage of its movement adjacent to the spacer.

2. A measuring device according to claim 1, wherein the supporting means for the two electrical tracks includes a support bearing two printed circuit terminal strips, each said circuit provided with a track.

3. A measuring device according to claim 2, wherein the supporting means is formed by two C-shaped members.

4. A measuring device according to claim 2, wherein the terminal strips are fixed to the supporting means by rivets engaged in elongated drillings made in the terminal strips.

5. A measuring device according to claim 1, wherein each spacer comprises a central shaft fixed to the supporting means for the tracks and a plurality of generally radial arms that are tangentially attached to the shaft.

6. A measuring device according to claim 5, wherein each of the arms is provided, at its externally radial end, with a skid which rests against an internal surface of the casing.

7. A measuring device according to claim 1, wherein an elastic strip exerts a downward stress on the supporting means.

8. A measuring device according to claim 1, comprising X spacers and X+1 floats, where X is an integer.

9. A measuring device according to claim 1, comprising tracks with a height of more than one meter.

10. A device for the measurement of a level or volume of liquid contained in a reservoir, comprising:
- a casing that houses the device;
- a supporting means supporting two generally vertical, separate electrical tracks, at least one of the tracks having an electrical resistance between its terminals;
- at least one spacer connecting the casing and the supporting means for the electrical tracks for reinforcing the supporting means;
- a plurality of floats placed on either side of each spacer, said plurality of floats including an upper float and a second float;
- a slider supported on each of the floats to connect the two tracks;
- a guide means on said supporting means for guiding said floats in vertical translation so that the floats follow the level of liquid; and
- means borne by each spacer to move the slider of each float away from at least one of the tracks when said float reaches a lower final stage of its movement adjacent to the spacer.

11. A measuring device according to claim 10, wherein the supporting means for the two electrical tracks includes a support bearing two printed circuit terminal strips, each said circuit provided with a track.

12. A measuring device according to claim 11, wherein the supporting means is formed by two C-shaped members.

13. A measuring device according to claim 11, wherein the terminal strips are fixed to the supporting means by rivets engaged in elongated drillings made in the terminal strips.

14. A measuring device according to claim 10, wherein an elastic strip exerts a downward stress on the supporting means.

15. A measuring device according to claim 10, comprising X spacers and X+1 floats, where X is an integer.

16. A measuring device according to claim 10, wherein each spacer comprises a central shaft fixed to the supporting means for the tracks and a plurality of generally radial arms that are tangentially attached to the shaft.

* * * * *

UNITED STATES PATENT AND TRADEMARK OFFICE
CERTIFICATE OF CORRECTION

PATENT NO. : 5,070,731
DATED : December 10, 1991
INVENTOR(S) : Baux et al.

It is certified that error appears in the above-indentified patent and that said Letters Patent is hereby corrected as shown below:

```
In column 2 at line 53 delete "In +h=same",
insert --In the same--
```

Signed and Sealed this

Twenty-fifth Day of July, 1995

Attest:

BRUCE LEHMAN

Attesting Officer

Commissioner of Patents and Trademarks